United States Patent
Ligata et al.

(10) Patent No.: US 11,184,855 B2
(45) Date of Patent: Nov. 23, 2021

(54) METHOD AND DEVICE FOR CONTROLLING A WIRELESS ACCESS POINT

(71) Applicant: Alcatel Lucent, Nozay (FR)

(72) Inventors: Amir Ligata, Antwerp (BE); Haris Gacanin, Antwerp (BE); Ahmad Abou Saleh, Antwerp (BE)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 16/314,803

(22) PCT Filed: Jul. 6, 2017

(86) PCT No.: PCT/EP2017/066880
§ 371 (c)(1),
(2) Date: Jan. 2, 2019

(87) PCT Pub. No.: WO2018/011045
PCT Pub. Date: Jan. 18, 2018

(65) Prior Publication Data
US 2019/0261275 A1      Aug. 22, 2019

(30) Foreign Application Priority Data
Jul. 11, 2016 (EP) .................................... 16305869

(51) Int. Cl.
*H04L 12/00*        (2006.01)
*H04W 52/02*       (2009.01)
(Continued)

(52) U.S. Cl.
CPC ...... *H04W 52/0245* (2013.01); *H04B 17/318* (2015.01); *H04W 16/14* (2013.01);
(Continued)

(58) Field of Classification Search
None
See application file for complete search history.

(56) References Cited

U.S. PATENT DOCUMENTS

2005/0213601 A1* 9/2005 Ginzburg .............. H04W 8/005
370/443
2006/0270426 A1* 11/2006 Marinier .............. H04W 24/00
455/501
(Continued)

FOREIGN PATENT DOCUMENTS

WO    WO-2015081990 A1    6/2015
WO    WO-2016086985 A1    6/2016

OTHER PUBLICATIONS

International Search Report (PCT/ISA/210) for PCT International Application No. PCT/EP2017/066880 dated Sep. 4, 2017.
(Continued)

*Primary Examiner* — Noel R Beharry
*Assistant Examiner* — Lionel Preval
(74) *Attorney, Agent, or Firm* — Harness, Dickey & Pierce, P.L.C.

(57) ABSTRACT

At least one embodiment relates to a method for controlling a wireless access point, including receiving, from a target wireless access point, management data representative of, for respective wireless end points associated with the target wireless access point, a received signal strength and a number of retransmissions, and IDs associated with neighboring wireless access points detected by the target wireless access point; identifying at least one wireless end point affected by a hidden node problem in function of the corresponding received signal strength and the number of retransmissions; identifying at least one potential hidden node in function of a channel used and a received signal strength of the detected neighboring wireless access points; and identifying a hidden node wireless access point based on
(Continued)

the wireless access points detected by the wireless end point identified as affected by a hidden node problem and the identified potential hidden node.

10 Claims, 1 Drawing Sheet

(51) Int. Cl.
| | |
|---|---|
| *H04B 17/318* | (2015.01) |
| *H04W 16/14* | (2009.01) |
| *H04W 74/08* | (2009.01) |
| *H04W 88/12* | (2009.01) |
| *H04W 72/08* | (2009.01) |
| *H04W 24/10* | (2009.01) |
| *H04W 88/08* | (2009.01) |

(52) U.S. Cl.
CPC ....... *H04W 74/0808* (2013.01); *H04W 88/12* (2013.01); *H04W 24/10* (2013.01); *H04W 72/082* (2013.01); *H04W 88/08* (2013.01); *Y02D 30/70* (2020.08)

(56) References Cited

U.S. PATENT DOCUMENTS

| | | | | |
|---|---|---|---|---|
| 2007/0183445 | A1* | 8/2007 | Kim | H04L 1/1607 370/461 |
| 2007/0242621 | A1* | 10/2007 | Nandagopalan | H04L 12/413 370/254 |
| 2010/0080183 | A1* | 4/2010 | Mishra | H04L 47/20 370/329 |
| 2012/0320768 | A1* | 12/2012 | Shaffer | H04W 40/16 370/252 |
| 2014/0036691 | A1* | 2/2014 | Madan | H04W 24/10 370/242 |
| 2015/0208441 | A1* | 7/2015 | Yoo | H04W 74/0816 370/338 |
| 2016/0270068 | A1* | 9/2016 | Akyurek | H04W 72/04 |
| 2017/0339693 | A1* | 11/2017 | Cierny | H04W 16/14 |

OTHER PUBLICATIONS

Motegi, Sho: "A directional MAC protocol with the DATA-frame fragmentation and short busy advertisement signal for mitigating the directional hidden node problem," 2012 IEEE 23rd International Symposium on Personal, Indoor and Mobile Radio Communications, Sep. 9, 2012.

Farnham, Tim: "REM based approach for hidden node detection and avoidance in cognitive radio networks," Global Communications Conference (GLOBECOM), 2012 IEEE, IEEE, Dec. 3, 2012.

* cited by examiner

METHOD AND DEVICE FOR CONTROLLING A WIRELESS ACCESS POINT

CROSS-REFERENCE TO RELATED APPLICATIONS

This application is a national phase under 35 U.S.C. § 371 of PCT International Application No. PCT/EP2017/066880, which has an international filing date of Jul. 6, 2017, which claims priority European Application No. 16305869.6, filed Jul. 11, 2016 the entire contents of each of which are hereby incorporated by reference.

FIELD OF THE INVENTION

The present invention relates to the field of telecommunications. In particular, the present invention relates to a method and a device for controlling a wireless access point, in particular in view of the hidden node problem.

BACKGROUND

One of the most common problems in Wi-Fi networks is related to interference. Dense deployments of Wi-Fi access points (APs) lead to a coverage overlapping which might have negative impact on the end-user's performance in the case that the neighboring APs operate on the same or adjacent nonorthogonal (with distance lower than 5) WLAN channels.

One should clearly distinguish two scenarios:
(1) Exposed node scenario, where the neighboring APs (operating on the same or adjacent channels) sense each other and adapt their transmission in line with the CSMA protocol. In this case, there is no direct interference between them (no package collision). Instead, the common resources (frequency) are being shared which results in lower achievable throughput for both networks.
(2) Hidden node scenario, where the neighboring APs don't sense each other but their coverage areas overlap. In such a scenario, the users located in the overlapping areas will be affected by downlink transmission from the neighboring-interfering AP. This is considered as a direct interference. This increases the number of retransmissions significantly. Moreover, these users usually do not experience high rssi levels, meaning that their performance can easily deteriorate.

Hidden node scenario is one of the most severe interference problems, and as such, has to be carefully studied. Known techniques related to the hidden node problem comprise:
Hidden node detection in dense Wi-Fi networks using MAC packet analysis aggregated from multiple APs.
Differentiation of the packet loss due to collisions or hidden node.
Detecting the hidden node, based on inspection of the MAC layer packet headers.
Hidden node removal driven by the physical carrier sensing (PCS) threshold tuning—that results with reduced coverage (shortening the maximum link length) and potential exposed node problems.

Nonetheless, the above mentioned techniques were tested and validated on the level of simulations with a lot of assumptions and simplifications, and thus may be difficult to implement. Furthermore, a feasible method to overcome a problem of hidden node has yet to be addressed.

SUMMARY

It is thus an object of embodiments of the present invention to propose a method and a device for controlling a wireless access point, which do not show the inherent shortcomings of the prior art.

Accordingly, embodiments relate to a method for controlling a wireless access point, executed by a control device, comprising:
receiving, from a target wireless access point, management data representative of, for respective wireless end points associated with the target wireless access point, a received signal strength and a number of retransmissions and of, for respective neighboring wireless access points detected by the target wireless access point, an ID, a received signal strength and a channel used,
identifying at least one wireless end point affected by a hidden node problem in function of the corresponding received signal strength and number of retransmissions,
identifying at least one potential hidden node in function of the channel used and the received signal strength of a detected neighboring wireless access points,
identifying a hidden node wireless access point by comparing the wireless access points detected by the wireless end point identified as affected by a hidden node problem and the identified potential hidden node.

Correspondingly, embodiments relate to a control device for controlling a wireless access point, comprising:
means for receiving, from a target wireless access point, management data representative of, for respective wireless end points associated with the target wireless access point, a received signal strength and a number of retransmissions and of, for respective neighboring wireless access points detected by the target wireless access point, an ID, a received signal strength and a channel used,
means for identifying at least one wireless end point affected by a hidden node problem in function of the corresponding received signal strength and number of retransmissions,
means for identifying at least one potential hidden node in function of the channel used and the received signal strength of a detected neighboring wireless access points,
means for identifying a hidden node wireless access point by comparing the wireless access points detected by the wireless end point identified as affected by a hidden node problem and the identified potential hidden node.

In some embodiments, wherein identifying at least one wireless end point affected by a hidden node problem comprises determining whether a corresponding received signal strength is below a first threshold and whether a corresponding number of retransmissions is above a second threshold.

Identifying at least one potential hidden node may comprise, for a neighboring wireless access point using the same channel as the target wireless access point, determining whether the received signal strength of said neighboring wireless access point is above a third threshold.

Identifying at least one potential hidden node may comprise, for a neighboring wireless access point using a different channel than the target wireless access point, determining whether the received signal strength of said neighboring wireless access point is above a fourth threshold which depends on a channel separation.

The method may comprise controlling the identified hidden node wireless access point by reducing power and/or changing channel.

The method may comprise comprising, after controlling the identified hidden node wireless access point, checking whether the identified wireless end point is still affected by a hidden node problem, in function of the corresponding received signal strength and number of retransmissions.

Embodiments also relate to a computer program comprising instructions for performing the method mentioned before when said instructions are executed by a computer.

BRIEF DESCRIPTION OF THE DRAWINGS

The above and other objects and features of the invention will become more apparent and the invention itself will be best understood by referring to the following description of embodiments taken in conjunction with the accompanying drawings wherein.

DESCRIPTION OF EMBODIMENTS

Figure 1:
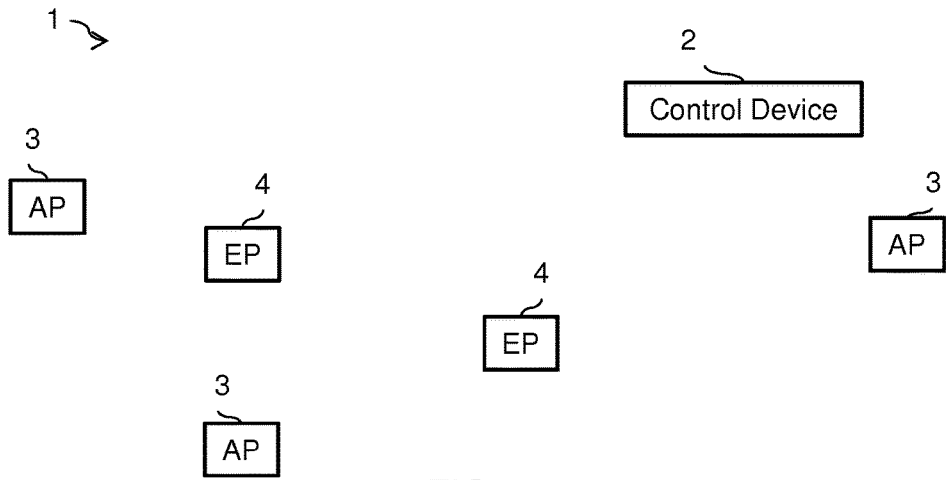
FIG. 1 is a bloc diagram of a telecommunication network.

FIG. 1 is a bloc diagram of a telecommunication network 1. The telecommunication network 1 comprises (among other), a control device 2, one or more wireless access points 3 and one or more wireless end points 4.

A wireless access point 3 and a wireless end point 4 are configured for wireless communication according to a wireless local area network protocol, for example the IEEE 802.11 standard (Wi-Fi). When a wireless end point 4 is located in the coverage area of two wireless access points 3, but the wireless access points 3 cannot sense each other, the wireless end point 4 may be affected by the hidden node problem.

In an example, a wireless access point 3 is a gateway for broadband access to an operator's network and a wireless end point 4 is a user terminal.

At least one of the wireless access points 3 is a managed node. The control device 2 may obtain management data from a managed node and send configuration data to a managed node, for example based on the Broadband Forum Technical Recommendation TR-181. The control device 2 is for example a server within an operator's network.

Similarly, at least one of the wireless end point 4 is a managed node. For example, a managed wireless end point 4 executes an app installed by the network operator. The app collects management data (for example, performs a WiFi scan) and sends the collected management data in response to a request from the control device 2.

In the telecommunication network 1, the control device 2 may detect a hidden node problem in function of the obtained management data, and take corrective actions in response to detecting a hidden node problem, as will be described in more details with reference to FIG. 2.

Figure 2:
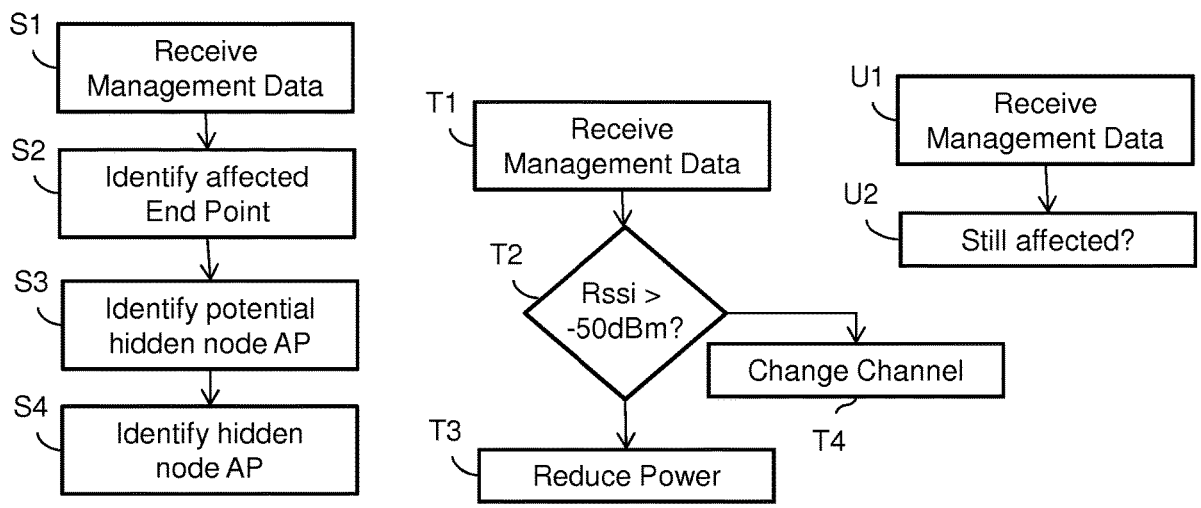
FIG. 2 is a flowchart of a method for controlling a wireless access point in the network of FIG. 1.

FIG. 2 is a flowchart of a method for controlling a wireless access point 3, executed by the control device 2. Hereafter, the wireless access point 3 controlled by the control device 2 may be referred to as the target wireless access point or the target AP, and other wireless access points 3 may be referred to as neighboring wireless access points.

The control device 2 receives management data from the wireless access point 3 (Step S1). The management data specify at least one of:

For respective wireless end points 4 associated with the target wireless access point 3, a received signal strength and a number of retransmissions (for example a retransmission counter). This is for example specified by Device.WiFi.AccessPoint.{i}.AssociatedDevice.{i}.SignalStrength and Device.WiFi.AccessPoint.{i}.AssociatedDevice.{i}.Retransmissions according to TR-181.

For respective neighboring wireless access points 3 detected by the target wireless access point 3, an ID (for example SSID), a received signal strength (for example rssi), a channel in use. This is for example specified by Device.WiFi.NeighboringWiFiDiagnostic.Result.{i} of TR-181.

Then, the control device 2 identifies wireless end points 4 affected by the hidden node problem in function of the received management data (Step S2). More specifically, a end point 4 affected by the hidden node problem may be identified for example in response to determining that the received signal strength is below a predetermined threshold and that the retransmission counter is above a predetermined threshold. For example if, for a wireless end point 4, rssi is below −55 dBm and retransmission >TH, where TH is a threshold which may be derived experimentally and may be function of the rssi, the wireless end point 4 is identified as affected by the hidden node problem.

The control device 2 obtains, from the identified wireless end point 4, management data specifying IDs (for example SSID) associated with neighboring wireless access points 3 detected by the identified wireless end points 4 (for example through Wi-Fi scan).

Then, the control device 2 identifies potential hidden nodes among the neighboring wireless access point 3 detected by the target AP (Step S3). More specifically, the control device 2 classifies the detected neighboring wireless access points 3 as either exposed node or potential hidden node in function of the channel used and the received signal strength of the neighboring wireless access point 3. For example:

For a neighboring AP{j} operating on the same channel as the target AP, if rssi(j)>CCA threshold, the control device 2 keeps AP{j} in an exposedNode list, and if rssi(j)<CCA threshold, the control device 2 keeps AP{j} in a potential hiddenNode list, where CCA threshold is a Clear Channel Assessment threshold.

For a neighboring AP{j} operating on an adjacent non-orthogonal channel, if rssi(j)−A(j−i)>EDthreshold, where "i" is the target AP channel, A(.) is an attenuation factor given by Table 1, and EDthreshold is the energy detection threshold, the control device 2 keeps the neighboring AP{j} in the exposedNode list, and if rssi(j)−A(j−i)<EDthreshold, the control device 2 keeps the neighboring AP{j} in the potential hiddenNode list. Note that this is equivalent to comparing the rssi with a threshold which depends on the channel separation.

TABLE 1

| | Channel Separation | | | | |
|---|---|---|---|---|---|
| | 1 | 2 | 3 | 4 | 5 |
| A(i) | 0.55 | 2.46 | 6.6 | 34.97 | 51.87 |

Here, it should be remarked that this does not contradict the definition of an hidden node. Indeed, the hidden nodes can be sensed by the target AP but with low rssi, and because of that they will not contend (rssi is below CCA threshold), meaning that they can transmit at the same time. For instance, the target AP can sense neighbors with rssi all the way to −95 dBm (noise floor) but will contend only with those that have rssi above CCA threshold, say −82 dBm. So all neighboring APs with rssi between −82 dBm and −95 dBm are considered as a potential hidden node. However, a wireless end point 4 may sense this hidden node with higher rssi—in case the end point is between the target AP and the hidden node.

Then, the control device 2 identifies a hidden node in function of the end points 4 affected by the hidden node problem identified at step S2 and of potential hidden node identified at step S3 (Step S4). For example, if a wireless access point 3 AP{k} is on the neighboring AP list of an affected end point 4 and on the potential hiddenNode list of the target AP, AP{k} is identified as a hidden node.

In case the identified hidden node is also a managed node (e.g. another Wi-Fi gateway from the same operator's network), then the control device 2 may take corrective actions. Accordingly, the control device 2 obtains management data from the neighboring wireless access point 3 identified as the hidden node (Step T1). The management data specify, for respective wireless end points 4 associated with the neighboring wireless access point 3, a received signal strength. This is for example specified by Device.WiFi.AccessPoint.{i}.AssociatedDevice.{i}.SignalStrength according to TR-181.

Then, the control device 2 compares the received signal strengths with a predetermined threshold (Step T2). For example, the control device 2 determines, for the respective wireless end points 4, whether rssi >−50 dBm.

If all associated devices have a signal strength higher than the threshold, they have strong coverage potential, and reducing the power level at the neighboring wireless access point 3 won't impact their achievable throughput. If so, the control device 2 reduces the power level of the neighboring AP (Step T3), for example from 100% to 50%, so that the affected user is no longer in coverage area of the neighboring network or it can hardly sense it.

In contrast, if one (or more) of the users have signal strengths below −50 dBm, the control device 2 controls the neighboring wireless access point 3 to select an orthogonal channel (Step T4).

After the corrective operation, the control device 2 checks whether the wireless end point 4 identified as affected by the hidden node problem is still affected.

Accordingly, the control device 2 obtains the rssi level of the neighboring network (i.e., hidden node) at the wireless end point 4 (Wi-Fi scan), and the retransmission counter of the wireless end point 4 (Step U1).

Then, if the affected device can hardly, or no longer sense the neighboring network, and retransmission counter is reasonably low, the control device 2 determines that the affected device is no longer affected (Step U2).

Steps S1-S4, T1-T4, U1 and U2 have been described as successive steps, but they may be executed in another order, in parallel, repeated in time . . . . A wireless access point 3 may be regarded both as the target AP (steps S1-S4) and a neighboring AP (steps T1-T4) for another target AP, for example successively or in parallel.

In the telecommunication network 1, a wireless end point 4 affected by the hidden node problem and the corresponding hidden node may be identified efficiently in function of management data obtained from the network elements. Moreover, corrective actions may remove the hidden node problem.

Figure 3:
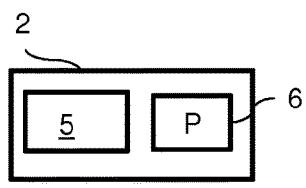
FIG. 3 is structural view of a control device for executing the method of FIG. 2.

FIG. 3 is a structural view of the control device 2, which comprises a processor 5 and a memory 6. The memory 6 stores a computer program P which, when executed by the processor 5, causes the control device 2 to execute the method described above with reference to FIG. 2.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represents various processes which may be substantially represented in computer readable medium and so executed by a computer or processor, whether or not such computer or processor is explicitly shown.

Embodiments of the method can be performed by means of dedicated hardware and/of software or any combination of both.

While the principles of the invention have been described above in connection with specific embodiments, it is to be clearly understood that this description is made only by way of example and not as a limitation on the scope of the invention, as defined in the appended claims.

The invention claimed is:

1. A method for controlling a wireless access point, executed by a control device, comprising:
   receiving, from a target wireless access point, management data representative of, for respective wireless end points associated with the target wireless access point, a received signal strength and a number of retransmissions associated with the wireless end point and of, for respective neighboring wireless access points detected by the target wireless access point, an ID, a received signal strength and a channel used associated with the neighboring wireless access point;
   identifying at least one wireless end point affected by a hidden node problem based on of the corresponding received signal strength and the number of retransmissions, and obtaining, from the identified wireless access points, management data specifying identifiers associated with neighboring wireless access points detected by the identified wireless access points;

identifying at least one potential hidden node based on of the channel used and the received signal strength of a detected neighboring wireless access points; and identifying a hidden node wireless access point in response to determining the hidden node wireless access points is one of the wireless access points detected by the wireless end point identified as affected by a hidden node problem and one of the identified potential hidden nodes, each of the wireless end points being user equipment.

2. The method according to claim 1, wherein the identifying at least one wireless end point affected by a hidden node problem comprises determining whether the corresponding received signal strength is below a first threshold and whether the corresponding number of retransmissions is above a second threshold.

3. The method according to claim 2, wherein the identifying at least one potential hidden node comprises, for a neighboring wireless access point using a same channel as the target wireless access point, determining whether the received signal strength of the neighboring wireless access point is above a third threshold.

4. The method according to claim 3, wherein the identifying at least one potential hidden node comprises, for a neighboring wireless access point using a different channel than the target wireless access point, determining whether the received signal strength of the neighboring wireless access point is above a fourth threshold which depends on a channel separation.

5. The method according to claim 1, comprising controlling the identified hidden node wireless access point by reducing power and/or changing channel.

6. The method according to claim 5, comprising, after controlling the identified hidden node wireless access point, checking whether the identified wireless end point is still affected by a hidden node problem, in function of the corresponding received signal strength and the number of retransmissions.

7. A non-transitory computer-readable medium storing instructions, which when executed by a computer, cause the computer to perform the method of claim 1.

8. A wireless access point, comprising:
a memory storing computer readable instructions; and
a processor configured to read the computer readable instructions in order to, receive, from a target wireless access point, management data representative of, for respective wireless end points associated with the target wireless access point, a received signal strength and a number of retransmissions associated with the wireless end point and of, for respective neighboring wireless access points detected by the target wireless access point, an ID, a received signal strength and a channel used associated with the neighboring wireless access point, identify at least one wireless end point affected by a hidden node problem based on the corresponding received signal strength and the number of retransmissions, and obtaining, from the identified wireless access points, management data specifying identifiers associated with neighboring wireless access points detected by the identified wireless access points, identify at least one potential hidden node based on the channel used and the received signal strength of a detected neighboring wireless access points, and identify a hidden node wireless access point in response to determining that the hidden node wireless access points is one of the wireless access points detected by the wireless end point identified as affected by a hidden node problem and one of the identified potential hidden nodes, each of the wireless end points being user equipment.

9. The method of claim 1, further comprising:
comparing a first number of retransmissions to a second threshold, the first number of retransmissions being associated with at least one first wireless end point, and
identifying that the at least one first wireless end point is not affected by the hidden node problem once the comparing indicates that the first number of retransmissions is below the second threshold.

10. The wireless access point of claim 8, wherein the processor is further configured to:
compare a first number of retransmissions to a second threshold, the first number of retransmissions being associated with at least one first wireless end point, and
identify that the at least one first wireless end point is not affected by the hidden node problem once the comparing indicates that the first number of retransmissions is below the second threshold.

* * * * *